United States Patent
Gao (10) Patent No.: US 8,908,857 B2
(45) Date of Patent: Dec. 9, 2014

(54) SOFT RESET METHOD FOR DSL APPARATUS

(71) Applicant: Huawei Device Co.,Ltd., Shenzhen, Guangdong (CN)

(72) Inventor: Yueli Gao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 208 days.

(21) Appl. No.: 13/632,285

(22) Filed: Oct. 1, 2012

(65) Prior Publication Data

US 2013/0028408 A1     Jan. 31, 2013

Related U.S. Application Data

(63) Continuation of application No. PCT/CN2011/072021, filed on Mar. 22, 2011.

(30) Foreign Application Priority Data

Mar. 29, 2010   (CN) .......................... 2010 1 0135805

(51) Int. Cl.
*H04M 1/00*   (2006.01)
*H04B 1/38*   (2006.01)
*G06F 9/00*   (2006.01)
*H04M 11/06*   (2006.01)

(52) U.S. Cl.
CPC .................................. *H04M 11/062* (2013.01)
USPC .......................... 379/399.01; 375/222; 713/2

(58) Field of Classification Search
None
See application file for complete search history.

(56) References Cited

U.S. PATENT DOCUMENTS

2007/0206776 A1* 9/2007 Patel et al. ............... 379/399.01
2008/0101448 A1* 5/2008 Meleis et al. ................. 375/225

FOREIGN PATENT DOCUMENTS

| CN | 1553580 A | 12/2004 |
| CN | 1852504 A | 10/2006 |
| CN | 1959594 A | 5/2007 |
| CN | 200973103 Y | 11/2007 |
| CN | 101156480 A | 4/2008 |
| CN | 101442604 A | 5/2009 |
| DE | 102009022826 A1 | 3/2010 |

(Continued)

OTHER PUBLICATIONS

Search report issued in corresponding European patent application No. 11761964.3, dated Sep. 20, 2012, 6 pages total.

(Continued)

*Primary Examiner* — Fan Tsang
*Assistant Examiner* — Jeffrey Lytle
(74) *Attorney, Agent, or Firm* — Leydig, Voit & Mayer, Ltd.

(57) ABSTRACT

A soft reset method for a DSL apparatus. The method includes: receiving a soft reset command; controlling, according to the soft command, a service module of the DSL apparatus to perform a soft reset; and simultaneously controlling, according to a preset service module type, a non-service module of the DSL apparatus to maintain a working status. According to at least some embodiments of the invention, during the soft reset process of the DSL apparatus, it is unnecessary to perform reset on all service modules and non-service modules, so that an initialization operation load of the system during the soft reset process is reduced. Moreover, because it is unnecessary to perform soft reset on non-service modules, time that is consumed during the soft reset process of the DSL apparatus is reduced, and the user experience is correspondingly enhanced.

12 Claims, 4 Drawing Sheets

(56) References Cited

FOREIGN PATENT DOCUMENTS

| EP | 0831624 | A2 | | 3/1998 | |
|---|---|---|---|---|---|
| EP | 1833271 | A1 | * | 9/2007 | ............... H04Q 7/30 |
| JP | 11112684 | A | | 4/1999 | |
| WO | 2008051394 | A2 | | 5/2008 | |

OTHER PUBLICATIONS

English translation of International search report for International application No. PCT/CN2011/072021, dated Jun. 30, 2011, 15 pages total.

* cited by examiner

SOFT RESET METHOD FOR DSL APPARATUS

CROSS-REFERENCE TO RELATED APPLICATION

This application is a continuation of International Patent Application No. PCT/CN2011/072021, filed on Mar. 22, 2011, which claims priority to Chinese Patent Application No. 201010135805.9, filed on Mar. 29, 2010, both of which are hereby incorporated by reference in their entireties.

FIELD OF THE INVENTION

The present invention relates to the field of communications technologies, and in particular, to a soft reset method for a digital subscriber line (DSL) apparatus.

BACKGROUND OF THE INVENTION

The DSL is a generic term of a set of technologies of digital data transmission provided on local telephone cables. In the prior art, DSL terminal apparatuses, usually referred to as DSL modems, are widely known. During an operation process of the DSL modem, if it is required to complete update configuration of a service, or to restore when there occurs an abnormality, the apparatus needs soft reset, namely, a software system of the DSL modem needs to be restarted. During soft reset of the DSL modem, all modules of the system are re-initialized. The modules, including service modules and non-service modules (for example, a DSL module), are initialized and activated again after the reset and restart of the software system.

During the research of the prior art, the inventors found that, during the reset of the software system, all modules including the DSL module are initialized, which increases the initialization operation load of the system during the soft reset process. Moreover, the DSL module needs to be activated again during the soft reset process, and the process may last for up to 60 to 70 seconds, which is far longer than the soft reset time of the service modules. Consequently, the restart of the DSL module extends the soft reset time of the DSL modem, and the long-time waiting during the soft reset process may further degrade the user experience.

SUMMARY OF THE INVENTION

Embodiments of the present invention provide a soft reset method for a DSL apparatus so as to reduce the soft reset time of the DSL apparatus.

In one aspect, an embodiment of the present invention provides a soft reset method for a DSL apparatus that includes: receiving a soft reset command; controlling, according to the soft reset command, a service module of the DSL apparatus to perform a soft reset; and simultaneously controlling, according to a preset service module type, a non-service module of the DSL apparatus to maintain a working status.

In another aspect, an embodiment of the present invention provides a soft reset control module for a DSL apparatus that includes: a receiving unit configured to receive a soft reset command; a first control unit configured to control, according to the soft reset command, a service module of the DSL apparatus to perform a soft reset; and a second control unit, configured to, when the first control unit controls the service module to perform the soft reset and control, according to a preset service module type, a non-service module to maintain a working status.

In at least some embodiments of the present invention, it is unnecessary to perform the soft reset on the non-service module, so that an initialization operation load of the system during the soft reset process is reduced. Moreover, because it is unnecessary to perform the soft reset on the non-service module, time that is consumed during the soft reset process of the DSL apparatus is reduced, and the user experience is correspondingly enhanced.

DETAILED DESCRIPTION OF THE EMBODIMENTS

In order to enable persons skilled in the art to better understand solutions in the embodiments of the present invention and make the objectives, features, and advantages of the embodiments of the present invention clearer, the embodiments of the present invention are further described below in detail with reference to specific embodiments and the accompanying drawings.

Figure 1:
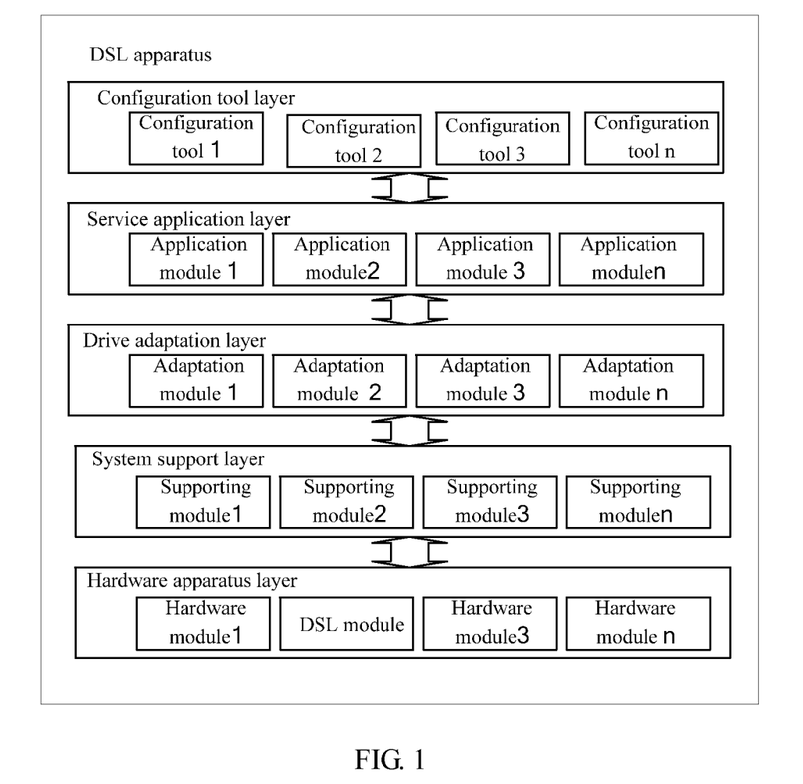
FIG. 1 is a schematic diagram of the architecture of a DSL apparatus according to an embodiment of the present invention.

FIG. 1 is a schematic diagram of the architecture of a DSL apparatus according to an embodiment of the present invention.

Figure 3:
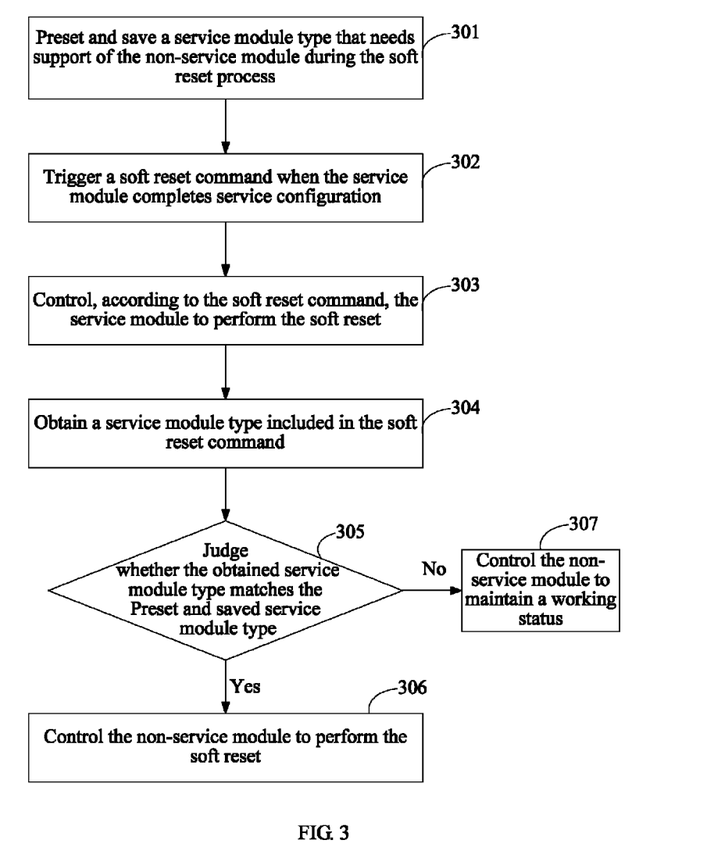
FIG. 3 is a flowchart of a soft reset method of a DSL apparatus according to a second embodiment of the present invention.

In this embodiment, the DSL apparatus is specifically a DSL modem. The DSL apparatus may be divided into a configuration tool layer, a service application layer, a drive adaptation layer, a system support layer, and a hardware apparatus layer. The configuration tool layer includes some configuration tools; the service application layer includes some specific application modules; the drive adaptation layer includes some adaptation modules; the system support layer includes some supporting modules; and the hardware apparatus layer includes some hardware modules and DSL modules. In embodiments of the present invention, when service modules and non-service modules are divided, the modules in the hardware apparatus layer in FIG. 3 are collectively referred to as the non-service modules, and the modules in other layers are collectively referred to as the service modules.

In at least some implementation of the embodiments of the present invention, after service configuration is performed on the service modules of the service application layer by the configuration tools of the configuration tool layer, only the modules in the configuration tool layer, the service application layer, the drive adaptation layer, and the system support layer are reset, while the modules in the hardware apparatus layer do not need to be reset. In particular, in the embodiments of the present invention the DSL module of the hardware apparatus layer is not soft reset. In addition, it may be preset, according to a requirement, that the soft reset is performed on the DSL module at the same time when the soft reset is performed on some service modules.

Figure 2:
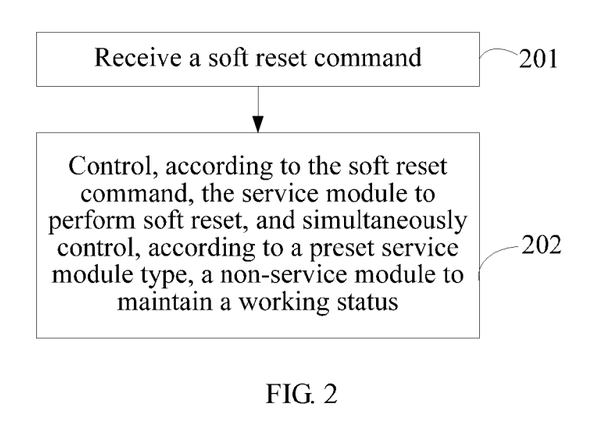
FIG. 2 is a flowchart of a soft reset method of a DSL apparatus according to a first embodiment of the present invention.

FIG. 2 is a flowchart of a soft reset method of a DSL apparatus according to a first embodiment of the present invention.

Step 201: Receive a soft reset command.

The soft reset command may be a soft reset command triggered when a service module completes service configuration, or a soft reset command triggered when a user operates a soft reset button of the DSL apparatus.

Step 202: Control, according to the soft reset command, the service module to perform soft reset, simultaneously control, according to a preset service module type, a non-service module to maintain a working status, and end the current process.

In this embodiment, step 202 may include:

presetting the service module type as not needing support of the non-service module during the soft reset, which may be understood as, in a system, presetting that a non-service does not need to perform soft reset during the soft reset of the preset service module; and controlling the non-service module to maintain the working status when controlling the service module to perform the soft reset.

The non-service module includes a DSL module, a WiFi module, and a USB (Universal Serial BUS, universal serial bus) module.

During the soft reset process of the DSL modem, when receiving the soft reset command, the DSL apparatus controls the service module to perform the soft reset and controls the non-service module to maintain the working status, namely controls the non-service module not to perform the soft reset. It is unnecessary to perform the soft reset on the non-service module, so that the initialization operation load of the system during the soft reset process is reduced; moreover, because it is unnecessary to perform the soft reset on the non-service module, time that consumed during the soft reset process of the DSL apparatus is reduced, and the user experience is correspondingly enhanced.

In this embodiment, a service module needs support of a non-service module during soft reset.

FIG. 3 is a flowchart of a soft reset method of a DSL apparatus according to a second embodiment of the present invention. The embodiment describes the control process of selecting, according to a preset service module type, whether to perform soft reset on the non-service module.

Step 301: Preset and save a service module type that needs support of the non-service module during the soft reset process.

The non-service module in the embodiment of the present invention mainly refers to a DSL module. The soft reset process of the service module is usually independent from the DSL module. However, it is not excluded that during soft reset of some specific service modules, a non-service module, such as the DSL module, needs to perform the soft reset simultaneously. In this embodiment, in step 301, the service module type that needs to perform soft reset together with a non-service module, such as the DSL module, may be preset and saved.

Referring to FIG. 1, the service module type may be divided according to the layer where the service module is located. For example, the type of a configuration tool module in the configuration tool layer belongs to a configuration-type service module; the type of an application module in the service application layer belongs to an application-typed service module; an adaptation module in the drive adaptation layer belongs to a drive-type service module; and a support module in the system support layer belongs to a support-type service module. Therefore, in the embodiment of the present invention, it may be preset that the DSL module performs the soft reset simultaneously when the configuration module in the configuration tool layer performs the soft reset, and it is set that the DSL module does not perform the soft reset when the service module in the service application layer performs the soft reset. Definitely, the above setting is not fixed, but may be adjusted flexibly according to actual requirements, which is not limited in the embodiments of the present invention.

Step 302: Trigger a soft reset command when the service module completes service configuration.

During an operation process of the DSL apparatus, after the service configuration is performed on some service modules, the configuration of the service modules can take effect only after the soft reset, so the soft reset command is triggered accordingly after the service module completes the configuration.

Step 303: Control, according to the soft reset command, the service module to perform the soft reset.

In this embodiment, it may be understood that, after the soft reset of the service module, it is needed to judge whether to perform the reset on the non-service module. In this embodiment, it may be determined whether the service module that performs the soft reset needs the non-service module to perform the reset, which may be understood as whether the service module is preset in the presetting of the system, that is, whether the non-service module is reset together when the service module performs the soft reset.

Step 304: Obtain a service module type included in the soft reset command.

Step 305: Judge whether the obtained service module type matches the preset and saved service module type; if yes, perform step 306; otherwise, perform step 307.

Step 306: Control the non-service module to perform the soft reset, and end the current process.

If the obtained service module type matches the preset and saved service module type, it indicates that the service module that currently performs the soft reset needs the non-service module to simultaneously perform the soft reset.

Step 307: Control the non-service module to maintain a working status, and end the current process.

If the obtained service module type does not match the preset and saved service module type, it indicates that the service module that currently performs soft reset does not need the non-service module to simultaneously perform soft reset. That is, it is only needed to perform the soft reset on the service module.

For example, referring to FIG. 1, the following information is preset and saved: a drive-type service module of the drive adaptation layer needs the non-service module DSL module to simultaneously perform soft reset during the soft reset process; and it is considered by default that other unsaved service module types do not need the DSL module to simultaneously perform the soft reset.

Based on the above configuration, assuming that an adaptation module in the drive adaptation layer triggers a soft reset command when completing configuration, the adaptation module is controlled, according to the soft reset command, to complete the soft reset, and then the type of the service module included in the soft reset command is obtained, which is "drive-type", and the preset and saved information is queried according to the "drive-type". As the "drive-type" matches the information, the non-service module DSL module is controlled to perform the soft reset as well. Further assuming that a support module in the system support layer triggers a soft reset command when completing configuration, the support module is controlled, according to the soft reset command, to complete the soft reset, and then the type of then service module included in the soft reset command is obtained, which is "support-type", and the preset and saved information is queried according to the "support-type". As the "support-type" does not match the information, it is unnecessary to control the DSL module to perform the soft reset, and the DSL module maintains the working status.

During the soft reset process of the DSL modem, when receiving the soft reset command, the DSL apparatus controls the service module to perform the soft reset, and controls, according to reset requirements of the service module, all the non-service module or a part of the non-service modules to maintain the working status. As it is not needed to perform the soft reset on all of the service modules and the non-service modules, the initialization operation load during the soft reset process is reduced; moreover, when the soft reset is not performed on the non-service module, the soft reset time of the DSL modem may be reduced.

Corresponding to the soft reset method of a DSL apparatus of the embodiment of the present invention, embodiments of the present invention further provide a soft reset control device of a DSL apparatus and a DSL apparatus.

Figure 4:
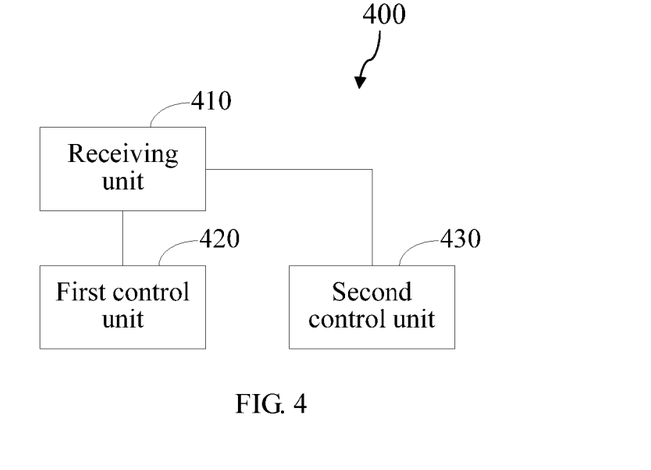
FIG. 4 is a block diagram of a soft reset control device of a DSL apparatus according to the first embodiment of the present invention.

FIG. 4 is a block diagram of a soft reset control device 400 of a DSL apparatus according to the first embodiment of the present invention.

The device includes: a receiving unit 410, a first control unit 420, and a second control unit 430.

The receiving unit 410 is configured to receive a soft reset command.

The first control unit 420 is configured to control, according to the soft reset command, a service module to perform soft reset.

The second control unit 430 is configured to, when the first control unit 420 controls the service module to perform the soft reset and according to a preset service module type, control a non-service module to maintain a working status.

Figure 5:
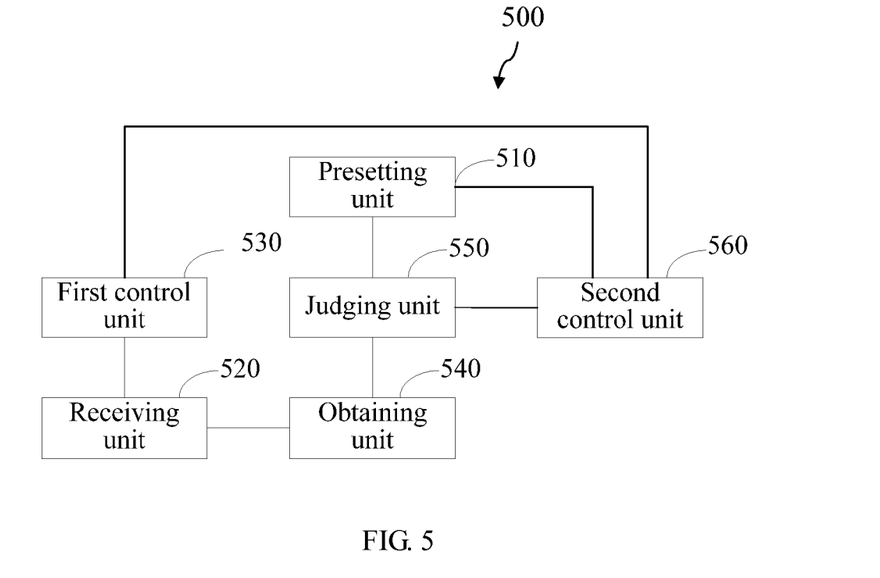
FIG. 5 is a block diagram of a soft reset control device of a DSL apparatus according to the first embodiment of the present invention.

FIG. 5 is a block diagram of a soft reset control device 500 of a DSL apparatus according to the second embodiment of the present invention.

The device includes: a presetting unit 510, a receiving unit 520, a first control unit 530, an obtaining unit 540, a judging unit 550, and a second control unit 560.

The presetting unit 510 is configured to preset and save a service module type during a soft reset process. In this embodiment, the presetting unit 510 may preset that the service module type does not need the support of the non-service module during the soft reset, namely, preset that a non-service does not need to perform the soft reset during the soft reset of the preset service module. The presetting unit 510 may also preset that, the service module needs the support of the non-service module during the soft reset, namely, preset and save the service module type that needs the support of the non-service module during the soft reset process.

The receiving unit 520 is configured to receive a soft reset command.

The first control unit 530 is configured to control, according to the soft reset command, a service module to perform soft reset.

The second control unit 530 is configured to, when the first control unit 420 controls the service module to perform the soft reset and according to the service module type preset by the presetting unit 510, control a non-service module to maintain a working status.

This embodiment includes the following two scenarios:

The first scenario is: preset that a non-service does not need to perform the soft reset during the soft reset of the preset service module.

At this time, when the first control unit 520 controls the service module to perform the soft reset, the second control unit 530 controls the non-service module to maintain the working status.

The second scenario is: preset that the service module needs the support of the non-service module during the soft reset, namely, preset and save the service module type that needs the support of the non-service module during the soft reset process.

At this time, the second control unit 530 is further configured to, when the first control unit 520 controls the service module to perform the soft reset and according to the service module type included in the soft reset command and the service module type that needs the support of the non-service module preset in the presetting unit 510, control the non-service module to maintain the working status.

At this time, the obtaining unit 540 is configured to obtain the service module type included in the soft reset command.

The judging unit 550 is configured to judge, according to the service module type, whether the obtained service module type matches the preset and saved service module type.

The second control unit 560 is configured to, when the judging result of the judging unit 550 is not matching, control the non-service module to maintain the working status, and when the judging result of the judging unit 550 is matching, control the non-service module to perform the soft reset.

Figure 6:
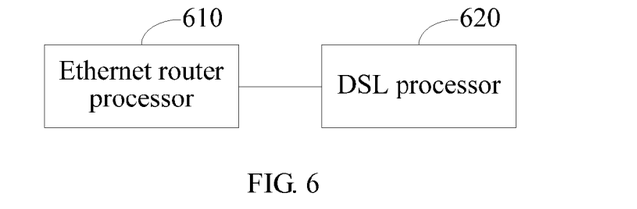
FIG. 6 is a block diagram of a DSL apparatus according to an embodiment of the present invention.

FIG. 6 is a block diagram of a DSL apparatus according to an embodiment of the present invention.

The DSL apparatus includes an Ethernet router processor 610 and a DSL processor 620. The Ethernet router processor 610 and the DSL processor 620 are connected to each other through a hardware interface.

The Ethernet router processor 610 is configured to receive a soft reset command, control, according to the soft reset command, a service module to perform soft reset, and control the DSL Processor 620 to maintain a working status.

Furthermore, the Ethernet router processor 610 is configured to preset and save a service module type that needs support of a non-service module during the soft reset process, and is further configured to obtain the service module type included in the soft reset command, judge, according to the service module type, whether the obtained service module type matches the preset and saved service module type, when it does not match, control the DSL processor 620 to maintain the working status, and when it matches, control the DSL processor 620 to perform the soft reset.

Figure 7:
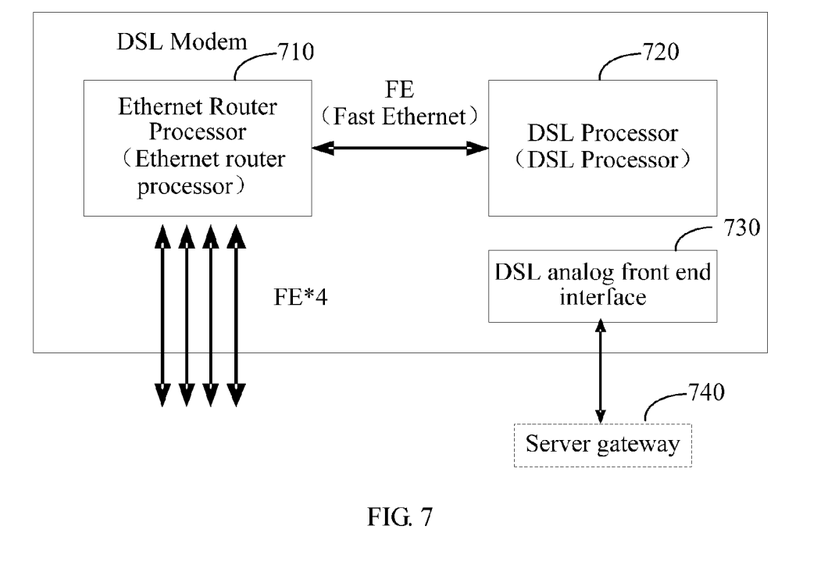
FIG. 7 is a schematic structural diagram of a DSL modem using a DSL apparatus according to an embodiment of the present invention.

FIG. 7 is a schematic structural diagram of a DSL modem using a DSL apparatus according to an embodiment of the present invention.

The DSL modem mainly includes an Ethernet Router Processor (Ethernet router processor, Ethernet router processor) 710 and a DSL Processor (DSL processor) 720. The Ethernet Router Processor 710 and the DSL Processor 720 are connected to each other through an FE (Fast Ethernet, fast Ethernet). The DSL Processor 720 is connected to an uplink server gateway 740 through a DSL analog front end interface 730.

The above Ethernet Router Processor 710 and the DSL Processor 720 may be regarded as two independent systems, which are connected to each other through the FE interface to complete service configuration and data transmission. The service configuration of the DSL modem is usually completed on the Ethernet Router Processor 710 side. If system reset is needed after the service configuration, it is only needed to reset the Ethernet Router Processor 710 side, that is, the Ethernet Router Processor 710 controls each service module to perform the reset. Accordingly, the DSL Processor 720 side maintains a normal operation status (the Ethernet Router Processor 710 does not need to send any control message to the DSL Processor 720), and maintains the connection and interaction of a physical link with the uplink server gateway 740. After completing the reset and restoring the normal operation status, the Ethernet Router Processor 710 side is reconnected to the DSL Processor 720 through the FE interface, and then is capable of completing a service such as dial-up access through the DSL Processor 720 immediately, without waiting for the DSL Processor 720 to be started and activated again.

The DSL apparatus of this embodiment, when receiving the soft reset command, controls the service module to perform the soft reset, and controls the non-service module to maintain the working status. In view of this, during the soft reset process of the DSL apparatus, the embodiments of the present invention do not need to perform the reset on all service modules and non-service modules, so that an initialization operation load of the system during the soft reset process is reduced; moreover, because it is unnecessary to perform soft reset on non-service modules, time that is consumed during the soft reset process of the DSL apparatus is reduced, and the user experience is correspondingly enhanced.

Persons skilled in the art may understand clearly that the embodiments of the present invention may be implemented through software and an essential universal hardware platform. The computer software product may be stored in a storage medium such as an ROM/RAM, a magnetic disk, or an optical disk, and include several instructions to instruct a computer apparatus (for example, a personal computer, a server, or a network apparatus) to perform the methods described in the embodiments of the present invention or in some parts of the embodiments of the present invention.

The foregoing embodiments are not intended to limit the present invention. For persons skilled in the art, any modification, equivalent replacement, and improvement made without departing from the principle of the present invention shall fall within the protection scope of the present invention.

What is claimed is:

1. A soft reset method for a digital subscriber line (DSL) apparatus, the method comprising:
   receiving a soft reset command;
   controlling, according to the soft reset command, a service module of the DSL apparatus to perform a soft reset;
   presetting and saving a first service module type that needs support of a non-service module of the DSL apparatus during the soft reset;
   obtaining a second service module type included in the soft reset command;
   determining, according to the first service module type and the second service module type, whether the second service module type included in the soft reset command matches the first service module type; and
   when the second service module type does not match the first service module type, performing controlling of the non-service module to maintain a working status.

2. The method according to claim 1, wherein the soft reset command comprises:
   a soft reset command triggered when the service module completes a service configuration; or
   a soft reset command triggered when a user operates a soft reset button of the DSL apparatus.

3. The method according to claim 1, wherein the non-service module comprises: a DSL module, a WiFi module, or a Universal Serial Bus (USB) module.

4. A soft reset control module for a digital subscriber line (DSL) apparatus, comprising:
   a receiving unit configured to receive a soft reset command;
   a first control unit configured to control, according to the soft reset command, a service module of the DSL apparatus to perform a soft reset; and
   a presetting unit configured to preset and save a first service module type that needs a sport of a non-service module of the DSL apparatus during the soft reset; and
   a second control unit configured to control, when the first control unit controls the service module to perform the soft reset, the non-service module to maintain a working status according to a second service module type included in the soft reset command and the first service module type preset by the presetting unit,
   wherein the first control unit and second control unit are comprised of one or more processors.

5. The soft reset control module according to claim 4, further comprising:
   an obtaining unit configured to obtain the second service module type included in the soft reset command; and
   a judging unit configured to determine, according to the first service module type and the second service module type, whether the second service module type matches the first service module type; and
   wherein the second control unit is further configured to, when a judging result of the judging unit is not matching, control the non-service module to maintain the working status, and when the judging result of the judging unit is matching, control the non-service module to perform the soft reset.

6. A soft reset method for a digital subscriber line (DSL) apparatus, the method comprising:
   receiving a soft reset command;
   controlling, according to the soft reset command, a service module of the DSL apparatus to perform a soft reset;
   presetting a first service module type that does not need support of the non-service module during the soft reset;
   obtaining a second service module type included in the soft reset command;
   determining, according to the first service module type and the second service module type, whether the second service module type included in the soft reset command matches the first service module type; and
   when the second service module type matches with the first service module type, performing controlling of the non-service module to maintain a working status.

7. The method according to claim 6, wherein the soft reset command comprises:
   a soft reset command triggered when the service module completes a service configuration; or
   a soft reset command triggered when a user operates a soft reset button of the DSL apparatus.

8. The method according to claim 7, wherein the non-service module comprises: a DSL module, a WiFi module, or a Universal Serial Bus (USB) module.

9. The method according to claim 6, wherein the non-service module comprises: a DSL module, a WiFi module, or a Universal Serial Bus (USB) module.

10. A soft reset control module for a digital subscriber line (DSL) apparatus, comprising:
   a receiving unit configured to receive a soft reset command;
   a first control unit configured to control, according to the soft reset command, a service module of the DSL apparatus to perform a soft reset;
   a presetting unit configured to preset and save a first service module type that does not need a support of the non-service module during the soft reset; and
   a second control unit is configured to control, when the first control unit controls the service module to perform the soft reset, the non-service module to maintain a working status according to a second service module type included in the soft reset command and the first service module type preset by the presetting unit,
   wherein the first control unit and second control unit are comprised of one or more processors.

11. The soft reset control module according to claim 10, further comprising:
   an obtaining unit configured to obtain the second service module type included in the soft reset command; and
   a judging unit configured to determine, according to the first service module type and the second service module type, whether the second service module type matches with the first service module type; and
   wherein the second control unit is further configured to, when a judging result of the judging unit is matching, control the non-service module to maintain the working status, and when the judging result of the judging unit is matching, control the non-service module to perform the soft reset.

12. The method according to claim 10, wherein the non-service module comprises: a DSL module, a WiFi module, or a Universal Serial Bus (USB) module.

* * * * *

UNITED STATES PATENT AND TRADEMARK OFFICE
CERTIFICATE OF CORRECTION

PATENT NO.        : 8,908,857 B2
APPLICATION NO.   : 13/632285
DATED             : December 9, 2014
INVENTOR(S)       : Gao It is certified that error appears in the above-identified patent and that said Letters Patent is hereby corrected as shown below:

*In the Claims*

Claim 4, column 8, line 18:

"module type that needs a sport" should read

"module type that needs a support"

Signed and Sealed this
Tenth Day of November, 2015

Michelle K. Lee
*Director of the United States Patent and Trademark Office*